United States Patent Office 3,026,325
Patented Mar. 20, 1962

3,026,325
5-HYDROXY-α-ALKYLTRYPTOPHANS
Richard V. Heinzelman, Kalamazoo Township, Kalamazoo County, and Douglas A. Lyttle and William C. Anthony, both of Kalamazoo, Mich., assignors to The Upjohn Company, Kalamazoo, Mich., a corporation of Delaware
No Drawing. Filed Jan. 26, 1959, Ser. No. 788,791
4 Claims. (Cl. 260—319)

The present invention relates to novel derivatives of indole and is more particularly concerned with 5-hydroxy-α-alkyltryptophans and with derivatives thereof.

The novel compounds of the invention can, for the most part, be represented by the general formula:

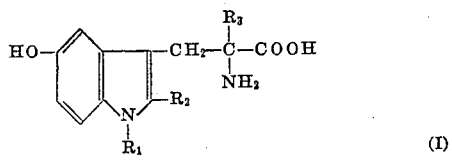

wherein $R_1$ and $R_2$ are selected from the class consisting of hydrogen and lower-alkyl and $R_3$ represents lower-alkyl. The novel compounds of the above general formula can be used in free amino acid form or, as will be described more particularly hereinafter, in the form of their acid addition salts, alkali metal salts, alkaline earth metal salts and their salts with amines.

The term "lower-alkyl" as used in this specification is intended to mean an alkyl radical containing from 1 to 6 carbon atoms, inclusive, such as methyl, ethyl, propyl, butyl, amyl, hexyl, and isomeric forms thereof.

In the preparation of the hydroxy-substituted compounds of the above general Formula I it is advantageous to prepare the corresponding lower-aralkoxy or lower-alkoxy derivative and to convert subsequently the aralkoxy or alkoxy radical to the hydroxy radical by various means which will be described hereafter. Suitable lower-alkoxy radicals include those radicals containing up to and including 8 carbon atoms, such as methoxy, ethoxy, isopropoxy, butoxy, octyloxy, and the like. Suitable lower-aralkoxy radicals include those radicals containing up to and including 15 carbon atoms such as benzyloxy, benzhydryloxy, alkylbenzyloxy, for example, para-methylbenzyloxy and para,para'-dimethylbenzhydryloxy, halobenzyloxy, for example, para-chlorobenzyloxy and para,para'-dichlorobenzhydryloxy, alkoxybenzyloxy, for example, para-methoxybenzyloxy and para,para'-dimethoxybenzhydryloxy, and the like.

It is an object of the present invention to provide the compounds having the above general Formula I. Other objects of the invention will be apparent to those skilled in the art to which this invention pertains.

The novel compounds of the above general Formula I are useful, in accordance with U.S. Patents 1,915,334 and 2,075,359, in forming amine fluosilicate mothproofing agents and, in accordance with U.S. Patents 2,425,320 and 2,606,155, in forming amine thiocyanate-formaldehyde condensation products for use as pickling inhibitors. In addition the novel compounds of the invention are active pharmacologically. Illustratively, the compound 5-hydroxy-α-methyltryptophan inhibits the enzyme system 5-hydroxy tryptophan decarboxylase which is responsible for the conversion of 5-hydroxytryptophan to serotonin in the body [Udenfriend et al., J. Biol. Chem. 224, 803 (1957)]. Whilst the precise role which serotonin plays in the complex series of chemical reactions occurring in the brain, both normal and abnormal, is not yet clear, it is becoming increasingly evident that serotonin does have a significant effect on the manner in which the brain functions, and may be a causative agent in mental disease.

5-hydroxytryptophan is known to be the precursor of serotonin released in the brain (serotonin itself does not cross the blood-brain barrier) [see Fed. Proc. 15, 402 and 493 (1957)]. Hence, the novel compound, 5-hydroxy-α-methyl-tryptophan which, as stated above, inhibits the enzyme responsible for the conversion of 5-hydroxytryptophan to serotonin, provides a means of regulating the supply of serotonin to the brain. The finding of this activity in the above compound is, accordingly, of considerable importance in therapy. The existence of this activity in the above compound is both novel and unexpected since the closely related compound, α-methyltryptophan, is devoid of such activity.

The novel compounds of the invention also inhibit other decarboxylases. Illustratively, 5-hydroxy-α-methyltryptophan inhibits the enzyme system dihydroxyphenylalanine decarboxylase and like decarboxylases, thus providing means of regulating bodily levels, including brain levels, of pharmacologically active amines such as dopamine, epinephrine, and norepinephrine. The regulation of serotonin, dopamine, epinephrine, norepinephrine, etc., is useful in the management of abnormal conditions such as mental disease, inflammations, allergies, and gastrointestinal hypermotility.

Further, the compounds of the invention having the Formula I are useful as intermediates in the formation of the corresponding tryptamines. Thus, the compounds having the Formula I can be decarboxylated using the method described by Hoshino, Proc. Imp. Acad. (Tokyo), 11, 227–8 (1935) [cf. Chemical Abstracts, 29, 6596 (1935)] for the conversion of N-methyltryptophan to N-methyltryptamine. The tryptamines so obtained possess valuable therapeutic properties. Illustratively, the tryptamines so obtained exhibit valuable oxytocic activity. Those tryptamines derived from the compounds of Formula I in which $R_2$ represents hydrogen possess the ability to resist oxidative deamination by the enzyme monoamine oxidase, and also are able to inhibit the enzymatic destruction of other amines, particularly serotonin, which are normally affected by the enzyme. Also, the tryptamines obtained by decarboxylation of the compounds of the invention are useful, in accordance with U.S. Patents 1,915,334 and 2,075,359 in forming amine fluosilicate mothproofing agents and, in accordance with U.S. Patents 2,425,320 and 2,606,155, in forming amine thiocyanate-formaldehyde condensation products for use as pickling inhibitors.

Further, the compounds of the invention having the Formula I are useful as intermediates in the formation of the correspondingly substituted 5-hydroxy-3-indoleacetic acids, which acids exhibit activity as plant growth regulators. Thus, the compounds of the invention can be subjected to diazotisation and decomposition of the intermediate diazonium compound to yield the corresponding 5-hydroxy-3-indolelactic acids. The latter compounds can then be subjected to oxidation to yield the corresponding indoleacetic acids.

The novel compounds of the invention can be prepared by the series of reactions shown below wherein RO represents a lower-alkoxy or lower-aralkoxy radical as hereinbefore defined, and $R_1$, $R_2$, and $R_3$ have the significance hereinbefore defined.

A.

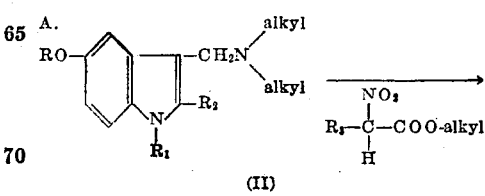

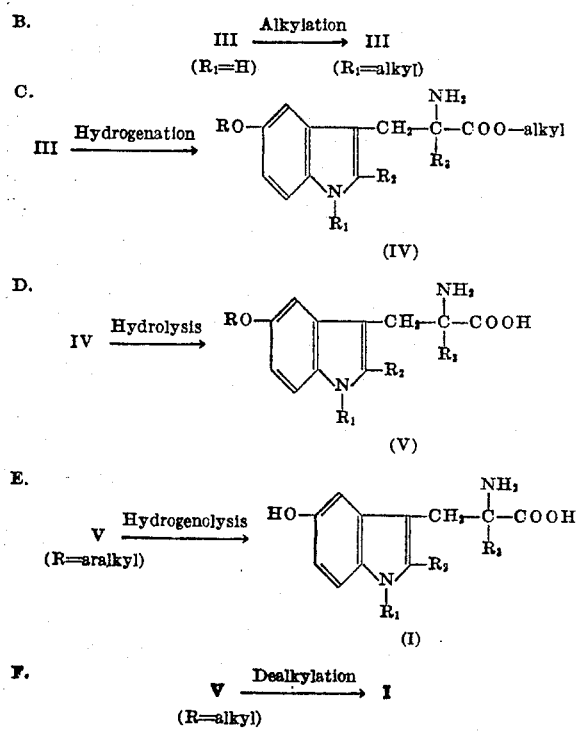

The process for the preparation of 5-hydroxy-α-alkyltryptophans (I) involves the following steps:

A. Nitroalkylating a 3 - (dialkylaminomethyl)indole (II), for example, 5-benzyloxy-3-(dimethylaminomethyl)-indole, with an alkyl ester of an α-nitroalkanoic acid having the structure shown in the above equation, such as ethyl α-nitropropionate, methyl α-nitrobutyrate, ethyl α-nitro-β-methylvalerate, propyl α-nitropropionate, and the like, to produce an alkyl ester of α-alkyl-α-nitro-3-indolepropionic acid (III), for example, ethyl α-methyl-α-nitro-5-benzyloxy - 3 - indolepropionate. The nitroalkylation can be carried out according to the process disclosed in U.S. Patents 2,557,041 and 2,616,896.

B. If the alkyl ester of α-alkyl-α-nitro-3-indolepropionic acid (III), produced in step A, is unsubstituted in the 1-position of the indole nucleus, that is to say, the group $R_1$=H, said compound can be converted, if desired, to the corresponding 1-alkyl derivative ($R_1$=alkyl). The alkylation can be effected by the process described by Baker, J. Chem. Soc. 458, 1940, or Potts et al., J. Chem. Soc. 2641, 1954, wherein the 1-alkyl substituent is added by reacting a 1-unsubstituted indole with an alkyl halide in the presence of an alkali metal alkoxide or amide. A particularly convenient method of carrying out the alkylation comprises reacting the 1-unsubstituted indole with an alkyl iodide and sodium hydride in the presence of dimethylformamide.

C. Reducing the nitro group in the alkyl ester of α-alkyl-α-nitro-3-indolepropionic acid (III), obtained in step A or B to yield the alkyl ester of the corresponding α-alkyltryptophan (IV), for example, the ethyl ester of 5-benzyloxy-α-methyltryptophan, using lithium aluminum hydride or hydrogen in the presence of a hydrogenation catalyst such as Raney nickel, platinum oxide, or palladium. When catalytic hydrogenation is employed for the reduction of the nitro compound (III) in which R=aralkyl, it is preferable, for the reasons given hereinafter, to employ a catalyst such as platinum oxide which does not also produce hydrogenolysis of the aralkoxy radical. With the above reservation, the procedure disclosed in U.S. Patent 2,557,041 can be employed for the reduction of the nitro compound (III).

D. Hydrolysis of the alkyl ester of α-alkyltryptophan (IV) to the corresponding free acid (V) using, for example, aqueous alkali such as aqueous sodium hydroxide solution, aqueous potassium hydroxide solution, and the like. This hydrolysis step can be carried out conveniently using the crude reaction mixture resulting from the process of step C without the need for isolation of the alkyl ester of α-alkyltryptophan produced in said step.

E. Where the radical R in the α-alkyltryptophan (V) obtained in step D is an aralkyl radical the said compound can be converted to the desired 5-hydroxy-α-alkyltryptophan (I) by hydrogenolysis in the presence of a palladium-on-charcoal catalyst as disclosed in U.S. Patent 2,708,197. As mentioned above, it is possible by the use of certain hydrogenation catalysts, for example, palladium-on-charcoal, in carrying out the reduction of the nitro compound III (R=aralkyl) in step C, to effect simultaneous reduction of the nitro group and hydrogenolysis of the aralkoxy radical in which R=aralkyl, i.e., step C and the present step E can be carried out simultaneously. In general, however, it has been found to be less desirable to carry out these two steps simultaneously since it is somewhat difficult to isolate the desired compound (I) from the resulting reaction mixture.

F. Where the radical R in the α-alkyltryptophan (V) obtained in step D is an alkyl radical the said compound can be dealkylated with aluminum chloride to the desired 5-hydroxy-α-alkyltryptophan (I) using the procedure of Asero et al. [Ann. 576, 69 (1952)].

The starting 3-(dialkylaminomethyl)indoles (II) can be prepared by reacting a suitably substituted indole with a dialkylamine in the presence of formaldehyde. For example, the procedures disclosed by Ek et al. [J. Am. Chem. Soc. 76, 5579 (1954)], Rydon et al. (J. Chem. Soc. 2462, 1951) and Bell et al. [J. Org. Chem. 13, 547 (1948)], who show the preparation of 5-benzyloxy-3-(dimethylaminomethyl)indole, 5 - ethoxy-3-(dimethylaminomethyl)indole, 5-methoxy - 3 - (dimethylaminomethyl)indole, 5-methoxy-2-methyl - 3 - (dimethylaminomethyl)indole, and 5-methoxy-1-methyl-3-(dimethylaminomethyl)-indole, can be employed.

The starting indoles suitably substituted in the 1-, 2- and 5-positions but unsubstituted in the 3-position can be prepared according to the following procedures:

(1) The 5-aralkoxyindoles are prepared in the manner disclosed by Burton et al., J. Chem. Soc. 1726, 1937.

(2) The 5-alkoxyindoles are prepared by the procedure outlined in Blaikie et al. (J. Chem. Soc. 296, 1924) for the preparation of 5-methoxyindole by utilizing the requisite 5-alkoxy-2-nitrotoluene.

(3) The 1-alkyl-5-substituted indoles can be prepared by the process described by Baker (supra) or Potts (supra), wherein the 1-alkyl substituent is added by reacting a 1-unsubstituted indole with an alkyl halide in the presence of an alkali-metal alkoxide or amide.

(4) The 2-alkyl-5-aralkoxy- and 2-alkyl-5-alkoxyindoles can be prepared by etherification of the corresponding 2-alkyl-5-hydroxyindoles which themselves can be prepared by the method of Nenitzescu as developed by Robertson et al., J. Chem. Soc. 2029, 1951. The 2-alkyl-5-substituted indoles so obtained can be converted to the corresponding 1,2-dialkyl-5-substituted indoles by the process described by Baker (supra) or Potts (supra).

Representative indoles which can be employed in the preparation of the 3-(dialkylaminomethyl)indoles (II) include the following: 5-benzyloxyindole, 5-ethoxyindole, 5 - (para-methylbenzloxy)indole, 5-benzhydryloxyindole, 5 - (para,para′ - dimethylbenzhydryloxy)indole, 5-(para-ethoxybenzyloxy)indole, 5-methoxyindole, 5-propoxyindole, 5-isopropoxyindole, 5-butoxyindole, 1-methyl-5- benzyloxyindole, 1-ethyl-5-ethoxyindole, 1-propyl-5-propoxyindole, 1 - propyl - 5 - (para - propylbenzyloxy)indole, 1-methyl-5-(para-chlorobenzyloxy)indole, 1-methyl-5-methoxyindole, 5-benzyloxy-2-methylindole, 5-benzyloxy-1-ethyl-2-methylindole, and the like.

The alkyl esters of α-nitroalkanoic acids utilized in Step A above can be produced by utilizing the procedure of Kornblum et al., J. Am. Chem. Soc. 77, 6654 (1955), who show the preparation of ethyl α-nitropropionate and ethyl α-nitrobutyrate.

The compounds of the invention having the general Formula I above, when in free amino acid form, are amphoteric in nature and form salts with both acids and bases. Thus, acid addition salts of the compounds having the Formula I can be prepared by treating a free amino acid having the Formula I with a stoichiometric amount of an organic or inorganic acid in the presence of a solvent such as water, a lower alkanol such as methanol, ethanol, isopropanol, and the like. Acids which can be employed in the preparation of such salts include sulfuric, hydrochloric, hydrobromic, nitric, phosphoric, acetic, lactic, citric, tartaric, benzoic, p-toluenesulfonic acids, and the like, as well as a mixture of sulfuric acid and a stoichiometric quantity of creatinine sulfate.

Similarly, by neutralization of a free amino acid having the Formula I with the appropriate base, alkali metal and alkaline earth metal salts, magnesium salts and like metal salts are obtained. For example, by treating a solution or suspension of a free amino acid having the Formula I with a stoichiometric amount of the appropriate base, such as sodium hydroxide, potassium hydroxide, calcium hydroxide, and the like, the corresponding sodium, potassium, calcium and like salts are obtained. Ammonium salts are obtained in like manner by substituting a nitrogenous base, such as ammonia or a suitable amine, for the inorganic base. Advantageously the neutralization is effected in an organic solvent such as methanol, ethanol, isopropanol, ethyl acetate, and the like. Thus, by treating a free amino acid having the Formula I with ammonia, mono-, di-, and trimethylamines, mono-, di-, and triethylamines, mono-, di-, and tripropylamines (iso and normal), ethyldimethylamine, benzyldiethylamine, cyclohexylamine, benzylamine, dibenzylamine, N,N-dibenzylethylenediamine, bis-(orthomethoxyphenylisopropyl)amine, and like lower-aliphatic, low-cycloaliphatic, and lower-araliphatic amines up to and including about 8 carbon atoms; heterocyclic amines such as piperidine, morpholine, pyrrolidine, piperazine, and the lower-alkyl derivatives thereof, such as 1-methylpiperidine, 4 - ethylmorpholine, 1 - isopropylpyrrolidine, 1,4-dimethylpiperazine, 1-n-butylpiperidine, 2-methylpiperidine, 1-ethyl-2-methylpiperidine, and the like; amines containing water-solubilizing or hydrophilic groups such as mono-, di-, and triethanolamines, ethyldiethanolamine, n-butylmonoethanolamine, 2 - amino - 1 - butanol, 2-amino-2-ethyl-1,3-propanediol, 2-amino-2-methyl-1-propanol, tris-(hydroxymethyl)aminomethane, phenylmonoethanolamine, p-tertiaryamylphenyldiethanolamine, and galactamine, N-methylglucamine, N-methylglucosamine, ephedrine, phenylephedrine, epinephrine, procaine, and the like, there are obtained the corresponding ammonium salts.

All the above-mentioned salts formed by compounds having the general Formula I with acids and with bases are suitable for use in human and animal therapy.

When employed in human and animal therapy, the compounds of the invention, in free amino acid form or in the form of salts, can be combined with solid or liquid pharmaceutical carriers and formulated in the form of tablets, powder packets, or capsules, or dissolved or suspended in suitable solvents, for oral or parenteral administration.

The following examples are illustrative of the products of the present invention, but are not to be construed as limiting.

EXAMPLE 1

*5-Hydroxy-α-Methyltryptophan and the Hydrochloride Thereof*

A. ETHYL α-METHYL-α-NITRO-5-BENZYLOXY-3-INDOLEPROPIONATE

A mixture of 66 g. (0.2355 mole) of 5-benzyloxygramine [J. Am. Chem. Soc., 76, 5583 (1954)], 34.7 g. (0.2355 mole) of ethyl α-nitropropionate, and 235 ml. of dry xylene was heated under reflux with stirring for 10 hours. During the whole of this time a vigorous stream of nitrogen was passed through the mixture to remove dimethylamine as it was formed. The solution so obtained was cooled and washed successively with 2 N hydrochloric acid, 2 N sodium hydroxide and finally with water. The washed solution was dried over anhydrous magnesium sulfate and then treated with 10 g. of decolorizing charcoal. The charcoal was removed by filtration and the filtrate was concentrated under vacuum. There was thus obtained 78.3 g. of a reddish-orange oil (A). A solution of 15 g. of this oil in a small quantity of benzene was placed on a chromatographic column in which 1 kg. of magnesium silicate (Florisil) was used as adsorbent. The column was developed with, successively, 2 liters of a mixture of 5 parts by volume of acetone and 95 parts by volume of Skellysolve B (a mixture of hexanes), 2 liters of a mixture of 7.5 parts by volume of acetone and 92.5 parts by volume of Skellysolve B, and 5 portions, each of 3 liters, of 10 parts by volume of acetone and 90 parts by volume of Skellysolve B. The first 12 liters of the eluate was combined and evaporated to dryness to yield an oil. The remainder of the crude product (A) was then dissolved in methylene chloride and treated with 40 g. of magnesium silicate (Florisil). The mixture was filtered, the filtrate treated with a further 30 g. of Florisil, filtered again and the filtrate evaporated. The residual oil was combined with the oil obtained from the chromatographic column. There was thus obtained a total of 48.9 g. of ethyl α-methyl-α-nitro-5-benzyloxy-3-indolepropionate in the form of a clear yellow oil.

*Anal.*—Calcd. for $C_{21}H_{22}N_2O_5$: C, 65.95; H, 5.80; N, 7.33. Found: C, 66.02; H, 5.61; N, 7.54.

B. 5-BENZYLOXY-α-METHYLTRYPTOPHAN

A mixture of 60.3 g. (0.1628 mole) of ethyl α-methyl-α-nitro-5-benzyloxy-3-indolepropionate, 12.0 g. of fresh, brown platinum oxide (Adams catalyst) and 500 ml. of 95% ethanol was treated with hydrogen at 40 p.s.i.g. in a stirring autoclave. The uptake of hydrogen was complete in 2.5 hours. The autoclave was then purged thoroughly with nitrogen, opened, and 81.0 g. of a 20% aqueous solution of sodium hydroxide was added. The autoclave was closed, a hydrogen atmosphere was reestablished and hydrolysis of the ester was allowed to proceed overnight at a temperature of 35° C. The autoclave was opened and a few crystals of sodium hydrosulfite were added to retard air oxidation of the reaction product. The reaction mixture was treated with 25 ml. of glacial acetic acid and the mixture was filtered to remove the catalyst, the latter being washed on the filter with 95% ethanol. The filtrate and washings were combined and concentrated by distillation under reduced pressure. When about 400 ml. of the solvent had been removed the residue commenced to crystallize. The residue was treated with 400 ml. of water and the mixture was maintained at 4° C. for 12 hours. The crystalline solid which had separated was collected by filtration, washed with water and dried; weight, 35.1 g. A second crop (5.14 g.) was obtained by concentration of the mother liquor. A small amount of the product was recrystallized from aqueous ethanol. There was thus obtained 5-benzyloxy-α-methyltryptophan in the form of a crystalline solid having a melting point of 273 to 275° C. with decomposition.

C. 5-HYDROXY-α-METHYLTRYPTOPHAN

A suspension of 43.8 g. (0.135 mole) of 5-benzyloxy-α-methyltryptophan in 200 ml. of 95% ethanol and 400 ml. of water was treated with hydrogen in a Parr hydrogenator in the presence of 25 g. of a 10% palladium-on-charcoal catalyst. The uptake of hydrogen was complete in 1.5 hours. The catalyst was removed by filtration (traces of apparently colloidal material were not removed by the filtration) and the filtrate was evaporated under reduced pressure. The residue was treated with an equal volume of hot water and the solution was filtered. The filtrate was concentrated under reduced pressure until crystallization commenced, and was then maintained at 4° C. overnight. The solid (17.8 g.) which had separated was isolated by filtration and a second crop (6.39 g.) was obtained by concentration of the mother liquors. The material was recrystallized several times from water. There was thus obtained 5-hydroxy-α-methyltryptophan in the form of a crystalline solid which darkened on heating to 250° C. but did not melt when heated as high as 296° C.

*Anal.*—Calcd. for $C_{12}H_{14}N_2O_3$: C, 61.52; H, 6.02; N, 11.96. Found: C, 60.98; H, 6.06; N, 12.09.

D. 5-HYDROXY-α-METHYLTRYPTOPHAN HYDROCHLORIDE

A solution of 1.0 g. of 5-hydroxy-α-methyltryptophan in 25 ml. of absolute ethanol was treated with a slight excess of a saturated solution of hydrogen chloride in ether. The resulting solution was treated with an excess of anhydrous ether and the solid which separated was isolated by filtration, washed with ether and dried. There was thus obtained 5-hydroxy-α-methyltryptophan hydrochloride.

EXAMPLE 2

*1,α-Dimethyl-5-Hydroxytryptophan*

A. 5-BENZYLOXY-3-INDOLECARBOXALDEHYDE

To 107.4 ml. of dimethylformamide was added slowly 33.6 g. (0.21 mole) of phosphorus oxychloride, the temperature being maintained at approximately 0° C. throughout. The mixture was stirred at 10 to 20° C. for 10 minutes and then a solution of 75 g. (0.336 mole) of 5-benzyloxyindole in 60 ml. of dimethylformamide was added slowly, maintaining the temperature at 20 to 30° C. throughout. The mixture was stirred at 30° C. for a further 1 hour at which point precipitation occurred. The reaction mixture was added to crushed ice and stirred until a fine suspension remained. A cold solution of 63.9 g. of sodium hydroxide in 336 ml. of water was added slowly. The insoluble material was isolated by filtration, washed with water and dried in air. The dry material was heated to the boiling point in 100 ml. of ethanol and the suspension was filtered. The precipitate was recrystallized from a mixture of dimethylformamide and water. There was thus obtained 5-benzyloxy-3-indolecarboxaldehyde in the form of a crystalline solid which had a melting point of 240 to 241° C. after darkening at 238° C.

*Anal.*—Calcd. for $C_{16}H_{13}NO_2$: C, 76.48; H, 5.21; N, 5.57. Found: C, 76.46; H, 5.31; N, 5.71.

B. 1-METHYL-5-BENZYLOXY-3-INDOLECARBOX-ALDEHYDE

A mixture of 37.5 g. (0.15 mole) of 5-benzyloxy-3-indolecarboxaldehyde, 25 g. (0.175 mole) of methyl iodide, 22 g. of potassium carbonate and 300 ml. of Carbitol (diethylene glycol monoethyl ether) was heated overnight on the steam bath. The reaction mixture was cooled and diluted with water. The solid which separated was isolated by filtration, washed well with water and recrystallized from ethanol. There was thus obtained 30.4 g. of 1-methyl-5-benzyloxy-3-indolecarboxaldehyde in the form of a crystalline solid having a melting point of 128 to 129° C.

*Anal.*—Calcd. for $C_{17}H_{15}NO_2$: C, 76.95; H, 5.69; N, 5.27. Found: C, 76.97; H, 5.51; N, 5.24.

C. 1-METHYL-5-BENZYLOXY-3-INDOLECARBOXYLIC ACID

A solution of 20.0 g. (0.075 mole) of 1-methyl-5-benzyloxy-3-indolecarboxaldehyde in 380 ml. of acetone was stirred and a solution of 24.0 g. (0.15 mole) of potassium permanganate in 300 ml. of water was added at a rate sufficient to maintain the temperature of the reaction mixture below 40° C. After the addition was complete, the mixture was stirred for a further hour and then filtered. The precipitate was washed on the filter with 50% aqueous acetone and the combined filtrate and washings were acidified by the addition of dilute hydrochloric acid. The solid which separated was isolated by filtration, washed well with water, dried and recrystallized from ethanol. There was thus obtained 12.0 g. of 1-methyl-5-benzyloxy-3-indolecarboxylic acid in the form of a crystalline solid having a melting point of 219 to 220.5° C.

*Anal.*—Calcd. for $C_{17}H_{15}NO_3$: C, 72.54; H, 5.37; N, 4.98. Found: C, 72.75; H, 5.32; N, 5.16.

D. 1-METHYL-5-BENZYLOXYINDOLE

A flat-bottomed flask containing 10 g. (0.035 mole) of 1-methyl-5-benzyloxy-3-indolecarboxylic acid was immersed in an oil-bath preheated to 245° C. After 15 minutes the flask was removed and allowed to cool. The residual dark solid was dissolved in hot acetone and diluted with 95% ethanol until crystallization commenced. The solid which separated was isolated by filtration and dried. There was thus obtained 7.0 g. of 1-methyl-5-benzyloxyindole in the form of a solid having a melting point of 130 to 131° C.

*Anal.*—Calcd. for $C_{16}H_{15}NO$: C, 80.98; H, 6.37; N, 5.90. Found: C, 81.03; H, 6.14; N, 5.61.

E. 5-BENZYLOXY-1-METHYLGRAMINE

A solution of 15 ml. of dioxane and 15 ml. of acetic acid was cooled to 10° C. and 1.2 ml. of 37% aqueous formaldehyde was added. A total of 3.3 ml. of 25% aqueous dimethylamine solution was then added slowly over a period of 5 minutes. The solution was stirred at 10° C. and a solution of 3.35 g. (0.014 mole) of 5-benzyloxy-1-methylindole and 15 ml. of dioxane was added over a period of 30 minutes. The solution was allowed to stand overnight and then 187 ml. of water was added. The resulting mixture was then filtered through kieselguhr and the filtrate was treated with an ice-cold solution of 14.0 g. of potassium hydroxide in 150 ml. of water. The mixture was cooled in an ice-bath and the solid which had separated was isolated by filtration, washed well with water and dried. The dried material (3.3 g.) was recrystallized from aqueous ethanol. There was thus obtained 5-benzyloxy-1-methylgramine in the form of a crystalline solid having a melting point of 48 to 50° C.

*Anal.*—Calcd. for $C_{19}H_{22}N_2O$: C, 77.51; H, 7.53; N, 9.51. Found: C, 78.08; H, 7.86; N, 9.69.

F. ETHYL 1,α-DIMETHYL-α-NITRO-5-BENZYLOXY-3-INDOLEPROPIONATE

A mixture of 32.0 g. (0.108 mole) of 5-benzyloxy-1-methylgramine, 15.8 g. (0.108 mole) of ethyl α-nitropropionate, 1.0 g. (0.025 mole) of sodium hydroxide and 120 ml. of xylene was refluxed for 24 hours under a slow stream of nitrogen. The resulting mixture was cooled and filtered. The filtrate was washed successively with water, dilute hydrochloric acid and then with water until the washings were neutral. The washed solution was dried over anhydrous potassium carbonate and then passed through a magnesium silicate (Florisil) column until the dark color had been removed. The resulting solution was evaporated to yield 5.5 g. of an amber-colored oil. There was thus obtained ethyl 1,α-dimethyl- α-nitro-5-benzyloxy-3-indolepropionate. The infrared absorption spectrum of the compound (mineral oil mull) exhibited maxima at 1745, 1623, 1580, 1555, 1495, 1355, 1305, 1262, 1225, 1210, 1125, 1020, 854, 792, 730 and 690 reciprocal centimeters.

G. 1,α-DIMETHYL-5-BENZYLOXYTRYPTOPHAN

A mixture of 5.4 g. (0.013 mole) of the above ethyl 1,α-dimethyl-α-nitro-5-benzyloxy-3-indolepropionate, 1.0 g. of platinum oxide (Adams catalyst), 60 ml. of ethanol and 30 ml. of ethyl acetate as treated with hydrogen at 50) p.s.i.g. for 1.5 hours in a stirring autoclave. The autoclave was opened and 6.6 ml. of 20% aqueous sodium hydroxide solution was added. The mixture was then shaken for 24 hours under nitrogen. A few crystals of sodium hydrosulfite and 2.1 ml. of acetic acid were added and the mixture was filtered. The precipitate was washed on the filter with alcohol and the combined filtrate and washings were evaporated to dryness. The residue was washed with water, dried and recrystallized from a mixture of ether and acetone. There was thus obtained 0.9 g. of 1,α-dimethyl-5-benzyloxytrytophan in the form of a crystalline solid which had a melting point of 234 to 238° C.

*Anal.*—Calcd. for $C_{20}H_{22}N_2O_3$: N, 8.28. Found N, 8.47.

H. 1,α-DIMETHYL-5-HYDROXYTRYPTOPHAN

A mixture of 1.4 g. (0.0041 mole) of 1,α-dimethyl-5-benzyloxytrytophan, 4.1 ml. of 0.1 N hydrochloric acid, 25 ml. of water, 25 ml. of 95% ethanol and 1.0 g. of 10% palladium-on-charcoal catalyst was shaken at 40° C. for 4 hours at an initial pressure of 50 p.s.i.g. of hydrogen. The mixture was neutralized with 4.1 ml. of 0.1 N sodium hydroxide solution and filtered through a Seitz filter. The filtrate was concentrated to approximately 10 ml. under reduced pressure at a temperature below 25° C. The residue was diluted with 100 ml. of acetone and filtered. The filtrate was diluted with an additional 100 ml. of acetone and cooled to 0° C. The supernatant liquid was decanted from a colored oil and was diluted with 100 ml. of acetone. After maintaining the solution at 0° C. for 7 days the solid which had separated was isolated by filtration and recrystallized from water. There was thus obtained 0.3 g. of 1,α-dimethyl-5-hydroxytryptophan dihydrate in the form of a crystalline solid having a melting point of 270 to 270° C.

*Anal.*—Calcd. for $C_{13}H_{16}N_2O_3 \cdot 2H_2O$: C, 54.92; H, 7.09; N, 9.86. Found: C, 55.0; H, 7.21; N, 9.83.

EXAMPLE 3

*1,α-Dimethyl-5-Hydroxytryptophan*

A solution of 45 g. (0.118 mole) of ethyl α-methyl-α-nitro-5-benzoxy-3-indolepropionate (prepared as described is Example 1A) in 100 ml. of anhydrous dimethylformamide was added to a mixture of 5.0 g. (0.21 mole) of sodium hydride and 100 ml. of dimethylformamide which had been cooled previously to approximately minus 50° C. When the liberation of hydrogen had ceased 29.8 g. (0.21 mole) of methyl iodide was added slowly over a period of 1 hour. The mixture was stirred overnight at room temperature and then carefully diluted with 9.0 ml. of ethanol. The resulting mixture was poured into water and cooled to 0° C. for several hours. The solid which had separated was isolated by filtration and recrystallized four times from methanol. There was thus obtained 14.0 g. of ethyl 1,α-dimethyl-α-nitro-5-benzyloxy-3-indolepropionate in the form of a crystalline solid having a melting point of 75 to 76.5° C.

*Anal.*—Calcd. for $C_{22}H_{24}N_2O_5$: C, 66.65; H, 6.10; N, 7.06. Found: C, 66.41; H, 6.10; N, 7.04.

This compound was then converted to 1,α-dimethyl-5-hydroxytryptophan via 1,α-dimethyl-5-benzyloxytryptophan according to the proctdure described in Example 1G and Example 1H.

EXAMPLE 4

*2,α-Dimethyl-5-Hydroxytryptophan*

A. 5-BENZYLOXY-2-METHYLGRAMINE

A solution of 92 ml. of dioxine, 92 ml. of acetic acid and 7.4 ml. of 37% aqueous formaldehyde was cooled to 10° C. and 20 ml. of 25% aqueous dimethylamine was added slowly. The solution was stirred for approximately 15 minutes after which a solution of 20 g. (0.08 mole) of 5-benzyloxy-2-methylindole (U.S. Patent 2,708,-197) in 92 ml. of dioxane was added over a period of 30 minutes. The resulting solution was allowed to stand overnight at approximately 20° C. and then 1150 ml. of water and a small quantity of decolorizing charcoal were added. The mixture was filtered through kieselguhr and the filtrate was made basic by the addition of a solution of 100 g. of potassium hydroxide in 900 ml. of water. The solid which separated was isolated by filtration, washed with water, dried and recrystallized from benzene. There was thus obtained 16.1 g. of 5-benzyloxy-2-methylgramine in the form of a crystalline solid having a melting point of 150 to 153° C.

*Anal.*—Calcd. for $C_{19}H_{22}N_2O$: C, 77.51; H, 7.53; N, 9.51. Found: C, 78.17; H, 7.27; N, 9.67.

B. ETHYL 2,α-DIMETHYL-α-NITRO-5-BENZYLOXY-3-INDOLEPROPIONATE

A mixture of 32.0 g. (0.108 mole) of 5-benzyloxy-2-methylgramine, 15.8 g. (0.108 mole) of ethyl α-nitropropionate, 1.0 g. (0.025 mole) of sodium hydroxide and 120 ml. of xylene was refluxed under a stream of nitrogen for 5 hours when the evolution of dimethylamine ceased. The mixture was cooled and filtered. The filtrate was washed 3 times with water, then with dilute hydrochloric acid and finally washed with water until the washings were free from acid. The washed solution was dried over anhydrous potassium carbonate, filtered, heated twice with decolorizing charcoal and filtered. The filtrate was evaporated to dryness to yield 32.5 g. of an oil. A 5.0 g. aliquot of the latter oil was chromatographed in the following manner. A quantity of 300 g. of magnesium silicate (Florisil) was added to a column of Skellysolve B. The excess solvent was drained and 50 ml. of benzene was allowed to pass into the column. The aliquot of the above oil was dissolved in 50 ml. of benzene and added to the column. The solution was allowed to drain to the top of the column and the column was then eluted with 660 ml. of a mixture of Skellysolve B containing 7.5% by volume of acetone, followed by 4 liters of a mixture of Skellysolve B containing 10% by volume of acetone. The separation was discontinued when a green band appeared at the bottom of the column. The filtrate from the second elution was concentrated to yield 4.8 g. of an amber-colored oil. There was thus obtained ethyl 2,α-dimethyl-α-nitro-5-benzyloxy-3-indolepropionate.

*Anal.*—Calcd. for $C_{22}H_{24}N_2O_5$: C, 66.65; H, 6.10; N, 7.06. Found: C, 66.68; H, 6.00; N, 7.03.

C. 2,α-DIMETHYL-5-BENZYLOXYTRYPTOPHAN

Using the procedure described in Example 1B, but substituting ethyl 2,α-dimethyl-α-nitro-5-benzyloxy-3-indolepropionate for ethyl α-methyl-α-nitro-5-benzyloxy-3-indolepropionate, there was obtained 2,α-dimethyl-5-benzyloxytryptophan monohydrate in the form of a crystalline solid having a melting point of 222 to 224° C. with decomposition, after darkening at 218° C.

*Anal.*—Calcd. for $C_{20}H_{22}N_2O_3 \cdot H_2O$: C, 67.39; H, 6.79. Found: C, 67.33; H, 6.85.

D. 2,α-DIMETHYL-5-HYDROXYTRYPTOPHAN

Using essentially the procedure described in Example 1C, but substituting 2,α-dimethyl-5-benzyloxytryptophan for 5-benzyloxy-α-methyltryptophan, there was obtained 2,α-dimethyl-5-hydroxytryptophan in the form of a crystalline solid having an indefinite melting point. The ultraviolet absorption spectrum of the compound (in solution in ethanol) exhibited maxima at 220, 279, 296, and 308 millimicrons. The infrared absorption spectrum of the compound (mineral oil mull) exhibited maxima at 790, 840, 880, 1093, 1207, 1233, 1265, 1392, 1398, 1480, 1584, 1620, 1640, 2440, 2550, 2630, 2730, 3180, 3260, 3380, and 3410 reciprocal centimeters.

*Anal.*—Calcd. for $C_{13}H_{16}N_2O_3$: C, 62.88; H, 6.49; N, 11.28. Found: C, 62.35; H, 6.82; N, 10.72.

EXAMPLE 5

*5-Hydroxy-α-Ethyltryptophan*

Using the procedure described in Example 1A, but substituting ethyl α-nitrobutyrate for ethyl α-nitropropionate, there was obtained ethyl α-ethyl-α-nitro-5-benzyloxy-3-indolepropionate. The latter compound was converted to 5-benzyloxy-α-ethyltryptophan using the procedure described in Example 1B, and the 5-benzyloxy-α-ethyltryptophan so obtained was converted to 5-hydroxy-α-ethyltryptophan using the procedure described in Example 1C.

EXAMPLE 6

*5-Hydroxy-α-Sec-Butyltryptophan*

Using the procedure described in Example 1A, but substituting ethyl α-nitro-β-methylvalerate [J. Am. Chem. Soc., 74, 4600 (1952)] for ethyl α-nitropropionate, there was obtained ethyl α-sec-butyl-α-nitro-5-benzyloxy-3-indolepropionate. The latter compound was converted to 5-benzyloxy-α-sec-butyltryptophan using the procedure described in Example 1B, and the 5-benzyloxy-α-sec-butyltryptophan so obtained was converted to 5-hydroxy-α-sec-butyltryptophan using the procedure described in Example 1C.

EXAMPLE 7

*Sodium Salt of 5-Hydroxy-α-Methyltryptophan*

A suspension of 1.0 g. (0.00427 mole) of 5-hydroxy-α-methyltryptophan (prepared as described in Example 1) in 25 ml. of water was treated with a solution of 0.17 g. (0.00427 mole) of sodium hydroxide in 20 ml. of water. The mixture was shaken until solution was complete and the solution so obtained was evaporated to dryness under reduced pressure. There was thus obtained the sodium salt of 5-hydroxy-α-methyltryptophan.

In like manner, employing potassium hydroxide in place of sodium hydroxide, there was obtained the potassium salt of 5-hydroxy-α-methyltryptophan.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound having the formula:

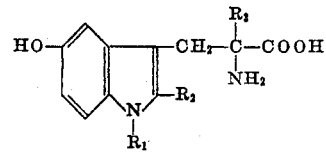

wherein $R_1$ and $R_2$ are selected from the class consisting of hydrogen and lower-alkyl, and $R_3$ represents lower-alkyl.

2. 5-hydroxy-α-methyltryptophan.
3. 1,α-dimethyl-5-hydroxytryptophan.
4. 2,α-dimethyl-5-hydroxytryptophan.

References Cited in the file of this patent

UNITED STATES PATENTS 2,766,255     Pfister et al. _____ Oct. 9, 1956

OTHER REFERENCES

Clark et al.: J. Biological Chemistry, vol. 210, pages 139–148 (1954).

UNITED STATES PATENT OFFICE
Certificate

Patent No. 3,026,325                                                           Patented March 20, 1962

Richard V. Heinzelman, Douglas A. Lyttle, and William C. Anthony

Application having been made jointly by Richard V. Heinzelman, Douglas A. Lyttle, and William C. Anthony, the inventors named in the patent above identified, and The Upjohn Company, Kalamazoo, Michigan, a corporation of Delaware, the assignee, for the issuance of a certificate under the provisions of Title 35, Section 256 of the United States Code, deleting the name of the said William C. Anthony from the patent as a joint inventor, and a showing and proof of facts satisfying the requirements of the said section having been submitted, it is this 23rd day of November 1965, certified that the name of the said William C. Anthony is hereby deleted from the said patent as a joint inventor with the said Richard V. Heinzelman and Douglas A Lyttle.

[SEAL]

EDWIN L. REYNOLDS,
*First Assistant Commissioner of Patents.*